US010981081B2

(12) United States Patent
Ahan et al.

(10) Patent No.: US 10,981,081 B2
(45) Date of Patent: Apr. 20, 2021

(54) DISTILLATION APPARATUS

(71) Applicant: Hanwha Chemical Corporation, Seoul (KR)

(72) Inventors: Woo Youl Ahan, Daejeon (KR); Hyelim Yang, Daejeon (KR); Geunsik Lim, Seoul (KR); Sungup Choi, Seongnam-si (KR); Jaekyu Jang, Daejeon (KR)

(73) Assignee: Hanwha Chemical Corporation, Seoul (KR)

(*) Notice: Subject to any disclaimer, the term of this patent is extended or adjusted under 35 U.S.C. 154(b) by 0 days.

(21) Appl. No.: 16/473,004

(22) PCT Filed: Dec. 14, 2017

(86) PCT No.: PCT/KR2017/014722
§ 371 (c)(1),
(2) Date: Jun. 24, 2019

(87) PCT Pub. No.: WO2018/124558
PCT Pub. Date: Jul. 5, 2018

(65) Prior Publication Data
US 2019/0321746 A1  Oct. 24, 2019

(30) Foreign Application Priority Data
Dec. 27, 2016 (KR) .................. 10-2016-0179642

(51) Int. Cl.
*B01D 3/30* (2006.01)
*B01D 3/32* (2006.01)
*B01D 1/22* (2006.01)

(52) U.S. Cl.
CPC .............. *B01D 3/30* (2013.01); *B01D 1/223* (2013.01); *B01D 3/32* (2013.01)

(58) Field of Classification Search
CPC ........ B01D 1/223; B01D 1/225; B01D 1/226; B01D 3/08; B01D 3/24; B01D 3/30
See application file for complete search history.

(56) References Cited

U.S. PATENT DOCUMENTS 2,218,342 A * 10/1940 Pegram .................... B01D 3/08
261/89
4,339,398 A * 7/1982 Feres ...................... B01J 19/32
261/89
(Continued)

FOREIGN PATENT DOCUMENTS

CN        201214025 Y    4/2009
JP         722646 A       1/1995
(Continued)

OTHER PUBLICATIONS

Udris, Aleks, "Why Do Fast Aircraft Have Swept Wings?", boldmethod.com, Jun. 24, 2014, URL: https://www.boldmethod.com/learn-to-fly/aerodynamics/wing-sweep/ (Year: 2014).*
(Continued)

*Primary Examiner* — Jonathan Luke Pilcher
(74) *Attorney, Agent, or Firm* — The Webb Law Firm

(57) ABSTRACT

The present invention relates to a distillation apparatus and, more particularly, to a distillation apparatus for recovering a high purity product through fractionation of volatile components from a material to be distilled, by using thermal energy and centrifugal force. The distillation apparatus can recover a high purity product from the material to be distilled without significant damage by reducing a pressure drop according to driving of the apparatus and thereby minimizing the temperature difference in the apparatus.

4 Claims, 6 Drawing Sheets

(56) References Cited

U.S. PATENT DOCUMENTS

| | | | |
|---|---|---|---|
| 4,995,945 A | 2/1991 | Craig | |
| 8,920,735 B2* | 12/2014 | Joo | B01D 19/02 |
| | | | 422/136 |
| 9,018,346 B2* | 4/2015 | Joo | B01J 19/006 |
| | | | 528/499 |
| 9,162,210 B2* | 10/2015 | Joo | B01J 19/006 |
| 9,364,780 B2* | 6/2016 | Shin | B01D 19/0047 |
| 9,446,332 B2* | 9/2016 | Shin | B01J 10/00 |
| 2014/0066580 A1* | 3/2014 | Joo | B01J 19/18 |
| | | | 526/71 |
| 2014/0088273 A1* | 3/2014 | Joo | B01J 19/0066 |
| | | | 526/71 |
| 2014/0107302 A1* | 4/2014 | Joo | B01J 19/0053 |
| | | | 526/71 |
| 2015/0274546 A1* | 10/2015 | Shin | B01D 46/002 |
| | | | 96/196 |
| 2015/0283488 A1* | 10/2015 | Shin | B01J 19/0066 |
| | | | 55/447 |
| 2015/0367254 A1* | 12/2015 | Shin | B01J 19/006 |
| | | | 96/216 |
| 2017/0354905 A1* | 12/2017 | Shin | B01D 19/0026 |

FOREIGN PATENT DOCUMENTS

| | | |
|---|---|---|
| KR | 1020120114848 A | 10/2012 |
| KR | 1020120132419 | 12/2012 |
| KR | 1020150034882 | 4/2015 |

OTHER PUBLICATIONS

Gil, "5 Factors that Determine Ceiling Fan Airflow", Ceilingfan.com, May 8, 2013, URL: https://blog.ceilingfan.com/5-factors-that-determine-ceiling-fan-airflow/ (Year: 2013).*

* cited by examiner

DISTILLATION APPARATUS

CROSS-REFERENCE TO RELATED APPLICATIONS

This application is the United States national phase of International Application No. PCT/KR2017/014722 filed Dec. 14, 2017, and claims priority to Korean Patent Application No. 10-2016-0179642 filed Dec. 27, 2016, the disclosures of which are hereby incorporated by reference in their entirety.

TECHNICAL FIELD

The present invention relates to a distillation apparatus, and more particularly, to a distillation apparatus for removing a volatile component from a distillation target material using thermal energy and centrifugal force to collect a high purity product.

BACKGROUND ART

A stripping column is an apparatus for vaporizing volatile components from a distillation target material in a liquid state using gas (gas or steam) via a distillation column having multiple stages to collect a high purity product therefrom.

In this case, the stripping column needs high-temperature thermal energy in order to collect a high purity product from a distillation target material, and thus there is a problem in that it is difficult to classify and collect a high purity product from foodstuffs, a high molecular substance, or the like, which is vulnerable to heat.

A spinning cone column (SSC) uses mechanical energy of centrifugal force in addition to thermal energy, the cited reference of which is disclosed in Japanese Patent Laid-Open Publication No. 1995-022646.

The SSC collects a high purity product from a distillation target material using mechanical energy which is centrifugal force through a distillation target material introduced from an upper portion and gas (steam) introduced from a lower portion, and thus it is possible to collect a high purity product at a low temperature compared with a stripping column due to a short contact time between the distillation target material and thermal energy.

In this case, the SSC has large pressure drop to cause a temperature difference between upper and lower portions of a body of the SSC, and in this regard, as the number of layers in a body formed by a rotary cone and a fixed cone is increased, a relative temperature difference is further increased.

That is, a range of a temperature condition for driving the SSC is widened, and thus there is a problem in that there is a limit in an operation for constantly collecting a high purity product from a distillation target material.

PATENT DOCUMENT (Patent Document 1) Japanese Patent Laid-Open Publication No. 1995-022646

DISCLOSURE

Technical Problem

An object of the present invention is to provide a distillation apparatus for removing a volatile component from a distillation target material using thermal energy and centrifugal force to collect a high purity product, which minimizes a temperature difference in the apparatus by reducing pressure drop due to driving to thus collect a high purity product without being seriously damaged from the distillation target material.

Technical Solution

In one general aspect, a distillation apparatus includes a body into which a distillation target material is introduced from an upper portion and gas is introduced from a lower portion, a rotation axis formed in up and down directions and configured to be axis-rotated in the body, a rotary cone that has a lower end fixed to an outer circumferential surface of the rotation axis and a horizontal-direction diameter being widened toward an upper end, a fixed cone spaced apart from the rotary cone in up and down directions and having an upper end fixed to an internal surface of the body, and a horizontal-direction diameter being reduced toward a lower end, and a fin formed on a lower surface of the rotary cone to extend in a direction toward a lower end from an upper end, and formed at an acute angle with respect to a lower surface of the rotary cone based on a rotation direction of the rotation axis.

The fin may be formed at an angle of 30° to 60° with respect to the lower surface of the rotary cone.

In another aspect, a distillation apparatus includes a body into which a distillation target material is introduced from an upper portion and gas is introduced from a lower portion, a rotation axis formed in up and down directions and configured to be axis-rotated in the body, a rotary cone that has a lower end fixed to an outer circumferential surface of the rotation axis and a horizontal-direction diameter being widened toward an upper end, a fixed cone spaced apart from the rotary cone in up and down directions and having an upper end fixed to an internal surface of the body, and a horizontal-direction diameter being reduced toward a lower end, a fin formed on a lower surface of the rotary cone to extend in a direction toward a lower end from an upper end, and a fan formed on a selected outer circumferential surface of the rotation axis in up and down directions, and having a lower end formed at an acute angle with respect to an axis of the rotation axis based on a rotation direction of the rotation axis.

The fan may be formed at an angle of 10° to 60° with respect to the axis of the rotation axis.

The fin may be formed at an acute angle with respect to a lower surface of the rotary cone based on a rotation direction of the rotation axis.

The fin may be formed at an angle of 30° to 60° with respect to the lower surface of the rotary cone.

The body may include a distillation target material inlet formed at one side of an upper portion and configured to allow a distillation target material to be introduced thereinto, a gas inlet formed at one side of a lower portion and configured to allow the gas to be introduced thereinto, a gas outlet formed at a remaining side of the upper portion and configured to allow the gas to be discharged therefrom, and a collection unit formed at a remaining side of the lower portion and configured to collect a high purity product.

Advantageous Effects

A distillation apparatus according to the present invention may be configured to advantageously change a fin formed on a lower surface a rotary cone to increase an ascending flow rate of the gas to reduce pressure drop, which minimizes a temperature difference in the distillation apparatus to thus collect a high purity product without being seriously damaged from the distillation target material.

The distillation apparatus according to the present invention may further include a fan formed to have a predetermined angle with respect to an axis-rotated rotation axis to thus be rotated at the same velocity as the rotation axis and to physically ascend gas, and thus turbulent kinetic energy and turbulent dissipation at a portion with the fan installed therein may be enhanced to enhance performance due to an increase in material transfer efficiency.

BEST MODE

Figure 1:
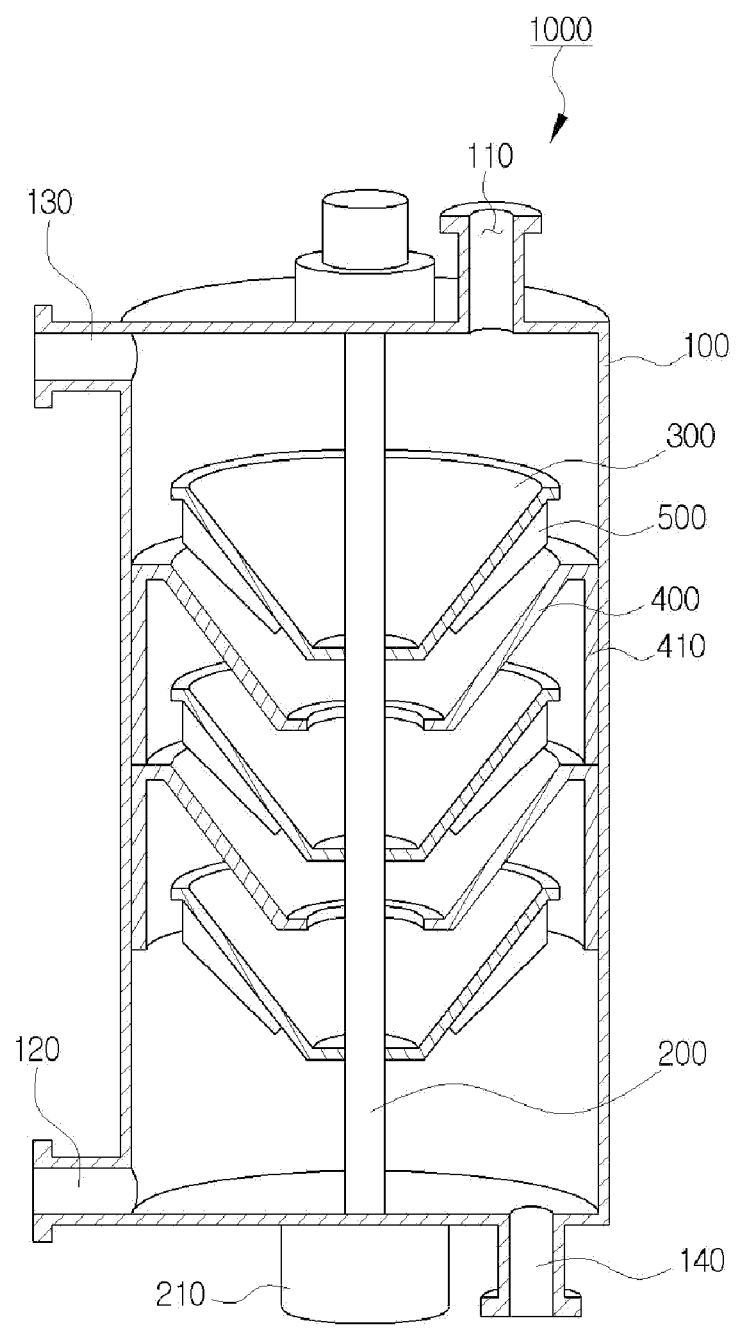
FIG. 1 is a diagram showing a distillation apparatus according to an embodiment of the present invention.

Hereinafter, a distillation apparatus will be described more fully with reference to the accompanying drawings, in which exemplary embodiments of the invention are shown.

Prior thereto, terms or words used herein shall not be limited to having common or dictionary meanings but should be construed as concepts not departing from the spirit and scope of the present invention according to the principle whereby the terms are conceptually defined in the most appropriate way in order to describe the present invention in the optimal way.

Accordingly, the embodiments in the specification and configuration shown in the drawings are merely illustrated for the purpose of illustrating embodiments of the invention, and it will be understood that the present invention is to cover various equivalents and alternatives that fall within the spirit and scope of the embodiments when the application is filed.

As shown in FIG. 1, a distillation apparatus 1000 according to an embodiment of the present invention may broadly include a body 100, a rotation axis 200, a rotary cone 300, a fixed cone 400, and a fin 500.

The body 100 may be formed to accommodate the rotation axis 200, the rotary cone 300, the fixed cone 400, and the fin 500, and a distillation target material may be introduced from an upper portion and gas (steam) may be introduced from a lower portion.

The body 100 may include a distillation target material inlet 110 for introducing a distillation target material thereinto, which is formed at one side of an upper portion of the body 100 to allow a distillation target material to be introduced from the upper portion and to be moved in a downward direction via gravity, and may include a gas inlet 120 for introducing the gas thereinto, which is formed at one side of a lower portion of the body 100 to allow the gas to be introduced from the lower portion and to be moved in an upward direction opposite to the distillation target material.

The body 100 may include a gas outlet 130 that is formed at the other side of the upper portion of the body 100 to allow remaining gas to be discharged to the outside among the gas introduced from the upper portion, and a collection unit 140 that is formed at the other side of the lower portion to collect a high purity product obtained by removing a volatile material from the distillation target material introduced from the upper portion.

However, positions for forming the aforementioned distillation target material inlet 110, the gas inlet 120, the gas outlet 130, and the collection unit 140 may be changed in various ways in various embodiments, and thus are not particularly limited.

The rotation axis 200 may be formed in upper and lower directions in the body 100 and may be formed to be axis-rotated in a selected direction.

In this case, the body 100 may include a rotation axis controller 210 or the like for supplying power for rotation of the rotation axis 200.

A lower end of the rotary cone 300 may be fixed to an outer circumferential surface of the rotation axis 200, in which case a horizontal-direction diameter of the rotary cone 300 may be increased toward an upper end and the rotary cone 300 may be rotated along axis-rotation together with the rotation axis 200.

The rotary cone 300 may be rotated together with the rotation axis 200 in a rotation direction while the lower end of the rotary cone 300 is fixed, in which case a horizontal-direction diameter of the rotary cone 300 may be increased toward an upper end (the rotary cone 300 is formed in the form of a bowl with a wide upper portion), and thus an introduced distillation target material may be distributed with a thickness that is reduced by centrifugal force due to rotation of the rotary cone 300, may be moved toward an upper end, and may fall onto the fixed cone 400 positioned below the rotary cone 300.

The fixed cone 400 may be spaced apart from the rotary cone 300 in up and down directions, an upper end of the fixed cone 400 may be fixed to an internal surface of the body 100, and a horizontal-direction diameter of the fixed cone 400 may be reduced toward a lower end.

That is, the rotary cone 300 and the fixed cone 400 may be spaced apart from each other in up and down directions, and thus a plurality of layers may be formed in the body, and through rotation of the rotation axis 200, the rotary cone 300 may be rotated together in an axis-rotation direction of the rotation axis 200 between up and down directions of the fixed cone 400.

The fixed cone 400 may be formed in a shape corresponding to a section of the rotary cone 300 and may guide the distillation target material that falls from the upper end of the rotary cone 300 onto the lower rotary cone 300.

The fixed cone 400 may further include a fixed cone extension unit 410 for connecting fixed cones 400 in up and down directions and firmly fixing the fixed cones 400 to an internal portion of the body 100, but is not limited thereto.

The fin 500 may be formed on a lower surface of the rotary cone 300 to extend in a direction toward a lower end from an upper end.

The fin 500 may be installed on the lower surface of the rotary cone 300 and may be rotated together with the rotary cone 300, and may increase an ascending flow velocity of the gas introduced from a lower portion of the body 100 to thus facilitate removal of volatile components included in the distillation target material and to also increase a detention time of the distillation target material, thereby increasing removal efficiency in the distillation target material.

The fin 500 may be formed in a shape, a height of which is increased toward the upper end of the rotary cone 300, thereby increasing ascending air current.

There may be various embodiments, for example, the fin 500 may be formed to be widened toward an upper end as a diameter of the rotary cone 300 is increased, but the present invention is not limited thereto.

Figure 2:
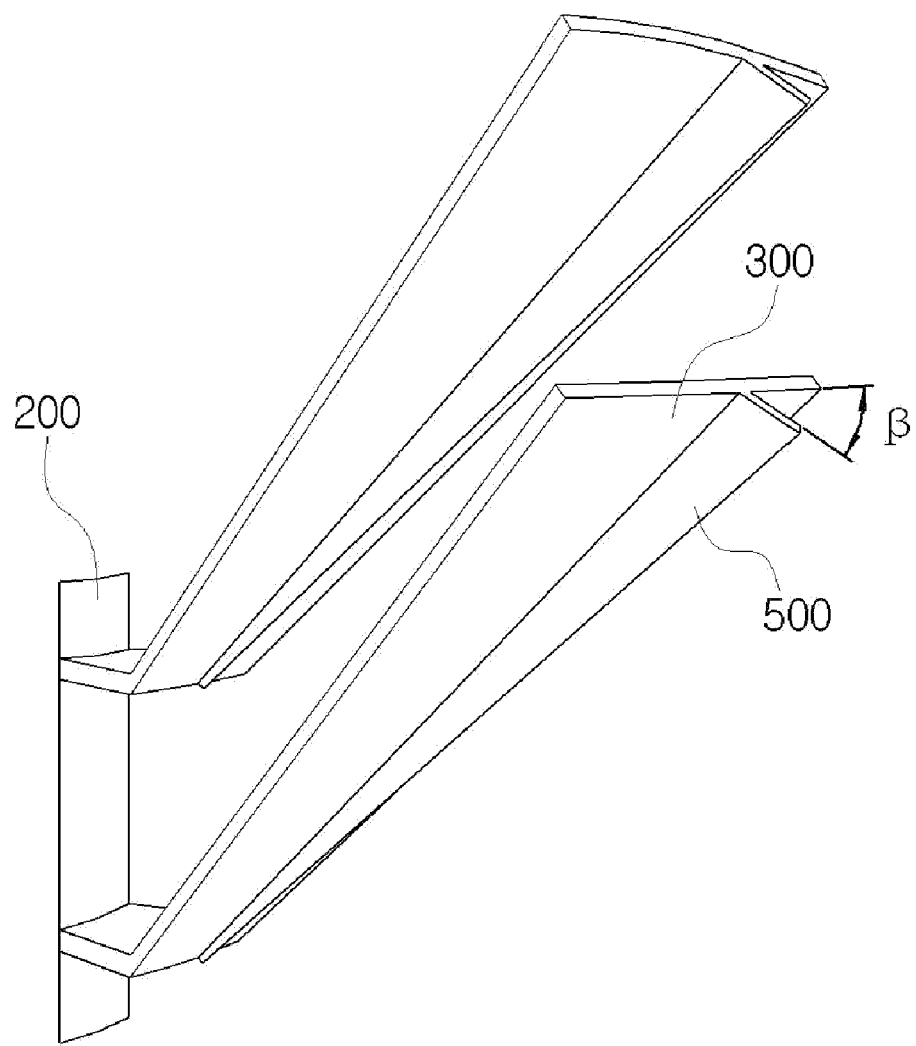
FIG. 2 is a diagram showing a shape of a fin included in a distillation apparatus according to an embodiment of the present invention.

In this case, according to an embodiment of the present invention, as shown in FIG. 2, the fin 500 of the distillation apparatus 1000 may be formed at an acute angle with respect to a lower surface of the rotary cone 300 based on a rotation direction of the rotation axis 200. (According to an embodiment of the present invention, the acute angle between the fin 500 and the lower surface of the rotary cone is indicated by β.)

The fin 500 may be inclined in the rotation direction of the rotation axis 200 to have an acute angle of 30° to 60° with respect to the lower surface of the rotary cone 300, and in detail, may be formed at an acute angle of 45° with respect to the lower surface of the rotary cone 300.

The fin 500 may be formed at an acute angle based on the rotation direction of the rotation axis 200, and thus a pressure drop due to the distillation target material that falls due to gravity may be reduced by a predetermined degree to minimize a temperature difference between layers in the body 100.

Figure 6:
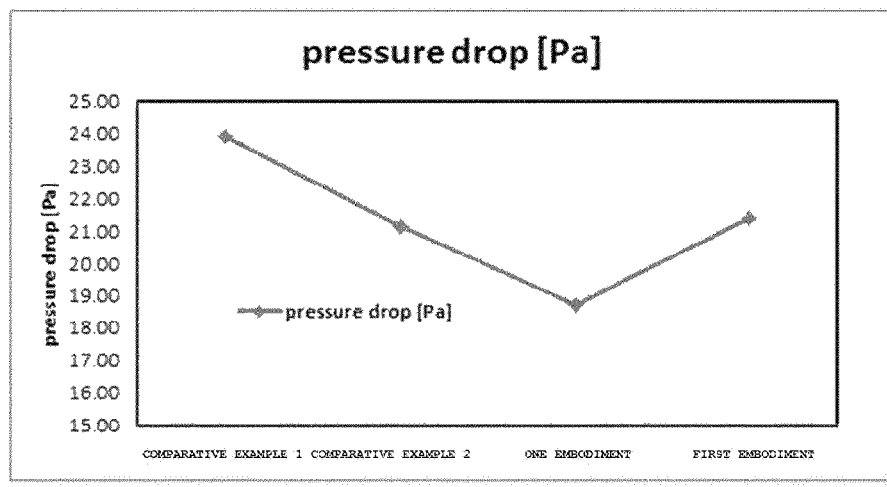
FIG. 6 is a diagram showing an effect of a distillation apparatus according to the present invention.
Figure 7:
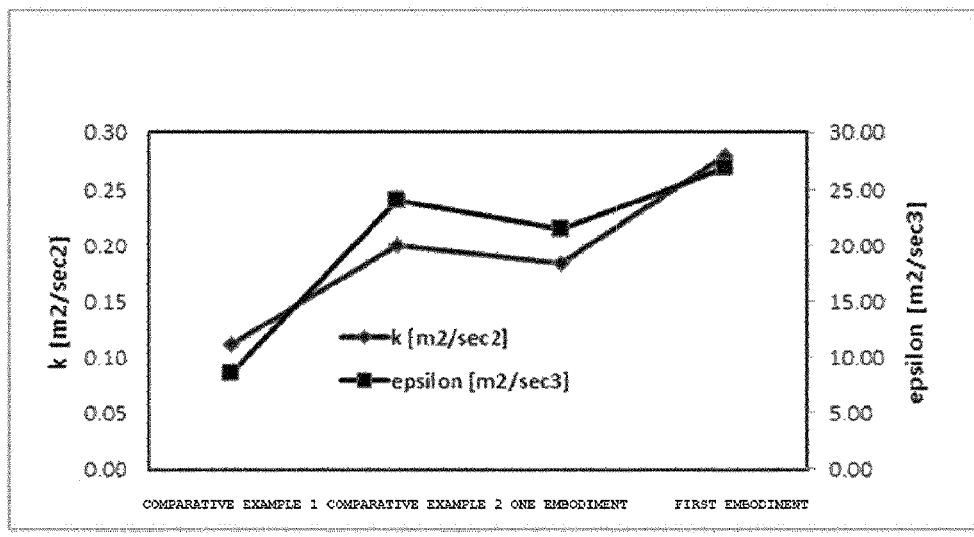
FIG. 7 is another diagram showing an effect of the distillation apparatus according to the present invention.

Table 1 and FIGS. 6 and 7 show experiment data for proving an effect based on the aforementioned shape of the fin 500 and show a comparison between the distillation apparatus 1000 according to an embodiment of the present invention in which the fin 500 is inclined in a rotation direction of the rotation axis 200 and a conventional spinning cone column (SSC).

In this case, with regard to the experiment, the body has a radius of 0.17 m, a radius of a rotation axis is 0.033 m, a radius of a rotary cone is 0.15 m, a radius of a fixed cone is 0.17 m, and an acute angle of the fin with respect to the lower surface of the rotary cone is 45°.

A rotation velocity of the rotation axis is 52.36 rad/sec, and the gas introduced from a lower portion of the body is supplied with a flow rate of 110 liters/min and is discharged to the outside through an upper portion of the body.

Figure 4:
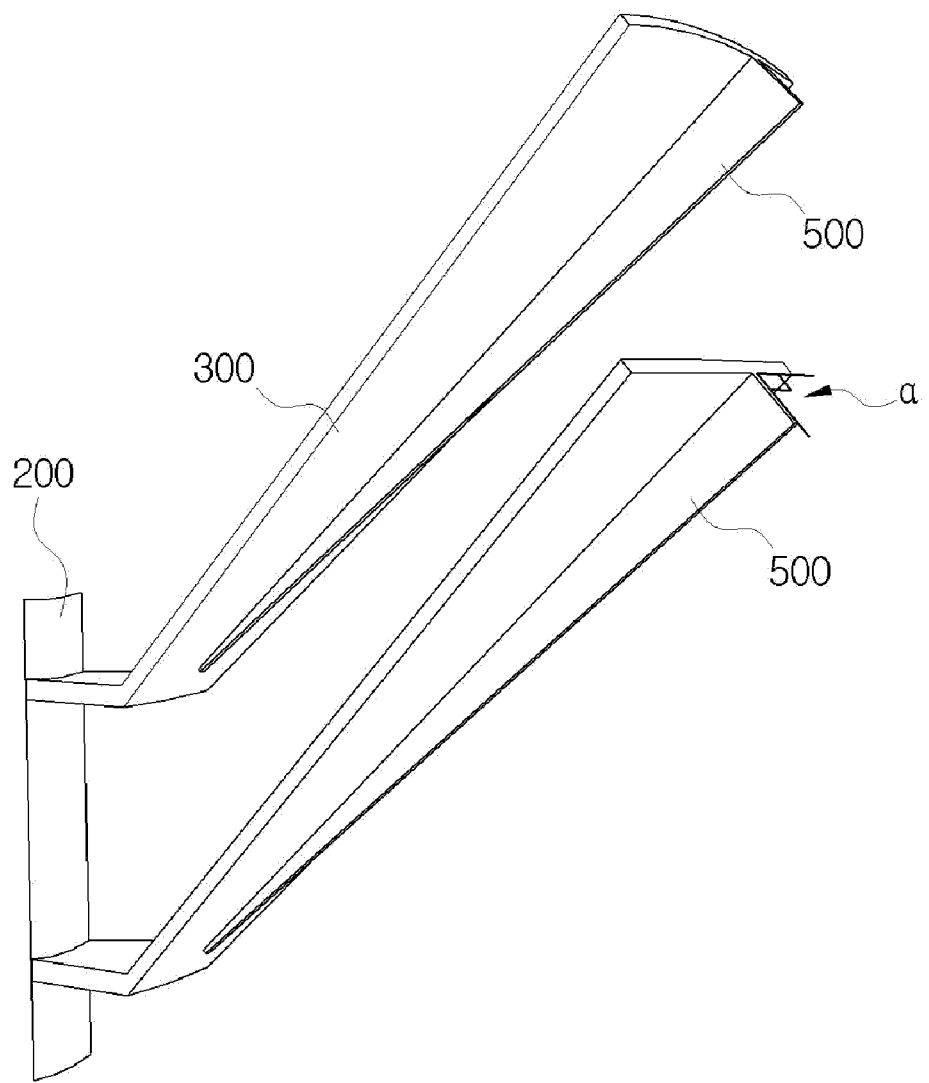
FIG. 4 is a diagram showing a shape of a fin included in a distillation apparatus according to a first embodiment of the present invention.

In Table. 1, Comparative Example 1 shows an SSC without a fin and Comparative Example 2 shows an SSC in which a fin is installed at a right angle α with respect to the lower surface of the rotary cone as shown in FIG. 4.

As seen from Table 1 and FIG. 6, the distillation apparatus 1000 according to an embodiment of the present invention has pressure drop that is reduced depending on an angle change of the fin 500 compared with Comparative Examples 1 and 2, and as seen from Table 1 and FIG. 7, the distillation apparatus 1000 has turbulent kinetic energy (k) and turbulent dissipation (epsilon) which are increased compared with Comparative Example 1 without a fin.

TABLE 1

| | Comparative Example 1 | Comparative Example 2 | Present Invention |
|---|---|---|---|
| Pressure drop [Pa] | 23.95 | 21.17 | 18.72 |
| k [m$^2$/sec$^2$] | 0.11 | 0.20 | 0.18 |
| Epsilon [m$^2$/sec$^3$] | 8.60 | 23.15 | 21.36 |

That is, the distillation apparatus 1000 according to an embodiment of the present invention may have driving efficiency that is enhanced along with an increase in turbulent kinetic energy and turbulent dissipation compared with Comparative Example 1 without a fin, and simultaneously may have a temperature difference in the apparatus as pressure drop is reduced by a predetermined degree compared with Comparative Example 2.

It may be advantageous that the efficiency of an operation of differentiating and collecting a high purity product without being seriously damaged from the distillation target material is increased.

<Distillation Apparatus According to First Embodiment of the Present Invention>

Figure 3:
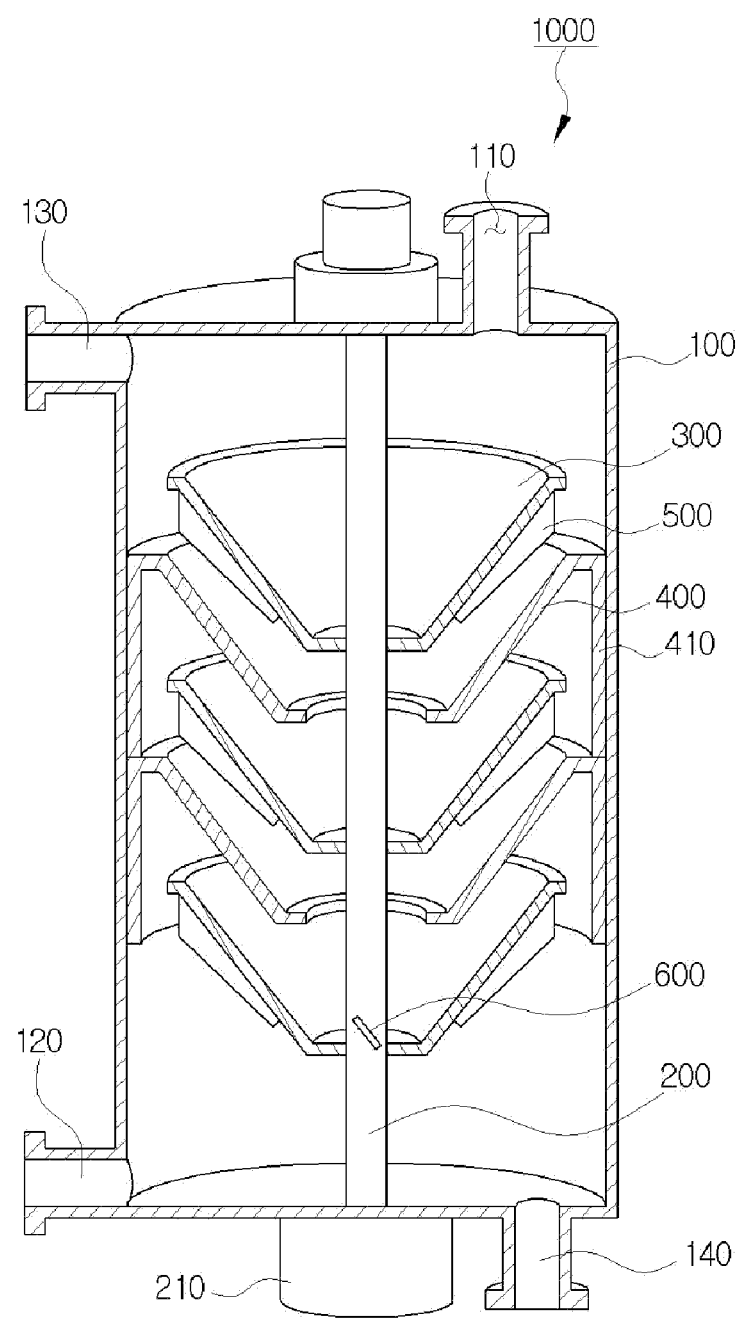
FIG. 3 is a diagram showing a distillation apparatus according to first and second embodiments of the present invention.

As shown in FIG. 3, the distillation apparatus 1000 according to a first embodiment of the present invention may broadly include the body 100, the rotation axis 200, the rotary cone 300, the fixed cone 400, the fin 500, and a fan 600.

The body 100, the rotation axis 200, the rotary cone 300, and the fixed cone 400 have been described above, and thus a detailed description thereof is omitted.

As shown in FIG. 4, the fin 500 may be formed on the lower surface of the rotary cone 300 to extend toward a lower end from an upper end, and as shown in FIG. 4, the fin 500 may be formed at a right angle α with respect to the lower surface of the rotary cone 300.

Figure 5:
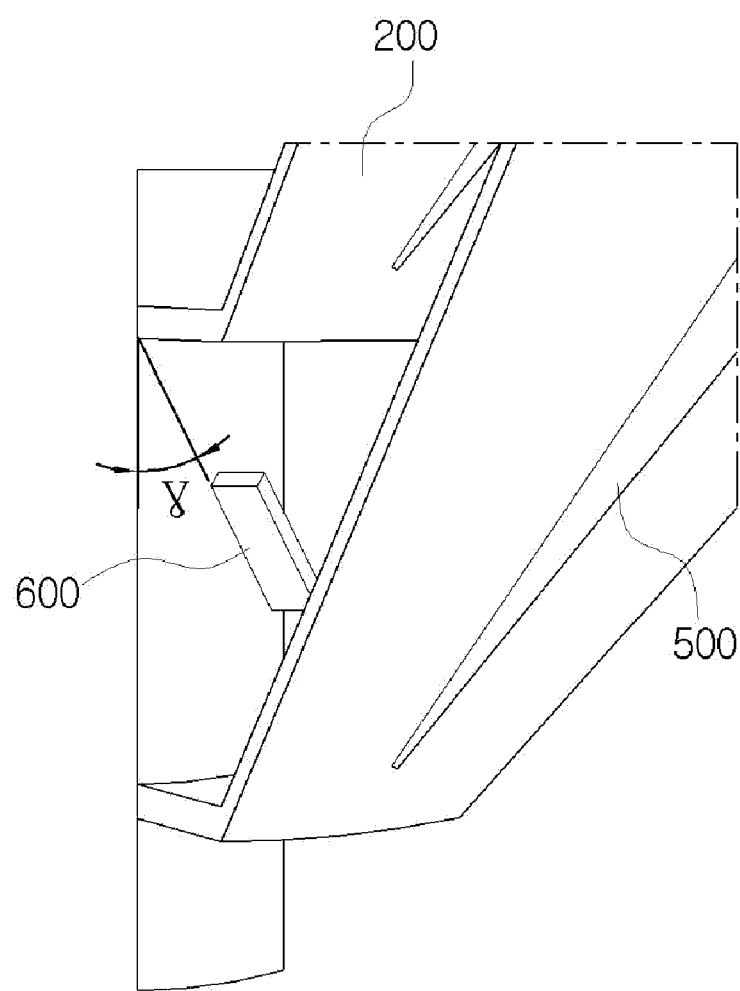
FIG. 5 is a diagram showing a shape of a fan included in a distillation apparatus according to the first embodiment of the present invention.

As shown in FIG. 5, the fan 600 may be formed on a selected outer circumferential surface of the rotation axis 200 to extend in up and down directions, in which case a lower end of the fan 600 may be formed at an acute angle with respect to an axis of the rotation axis 200 based on the rotation direction of the rotation axis 200. (An acute angle between the fan 600 according to the first embodiment of the present invention and the axis of the rotation axis 200 is indicated by γ.)

The fan 600 may be formed on the outer circumferential surface of the rotation axis 200 to protrude in a rectangular shape and may be rotated together with the rotation axis 200 to thus increase an ascending air current introduced from the lower portion of the body 100.

In this case, the lower end of the fan 600 may have an acute angle of 10° to 60° with respect to the axis of the rotation axis 200, and in detail, may have an acute angle of 30° with respect to the axis of the rotation axis 200, thereby increasing turbulent kinetic energy and turbulent dissipation in the body.

Table 2 and FIGS. 6 and 7 show data for proving an effect based on the aforementioned configuration of the fan and the shape with the rotation axis and the acute angle, and show comparison between the distillation apparatus according to the first embodiment of the present invention including the aforementioned fan and the conventional SSC.

In this case, with regard to the experiment, the body has a radius of 0.17 m, a radius of a rotation axis is 0.033 m, a radius of a rotary cone is 0.15 m, a radius of a fixed cone is 0.17 m, an angle of the fin with respect to the lower surface of the rotary cone is a right angle α, and the fan is formed at an acute angle of 30°.

A rotation velocity of the rotation axis is 52.36 rad/sec, and the gas introduced from a lower portion of the body is supplied with a flow rate of 110 liter/min and is discharged to the outside through an upper portion of the body.

In Table. 2, Comparative Example 1 shows an SSC without a fan and Comparative Example 2 shows an SSC that includes a fin but does not include a fan.

As seen from Table 2 and FIG. 6, the distillation apparatus according to the first embodiment of the present invention has pressure drop that is barely different from Comparative Examples 1 and 2, but as seen from Table 2 and FIG. 7, the distillation apparatus has turbulent kinetic energy (k) and turbulent dissipation (epsilon) which are increased compared with Comparative Examples 1 and 2.

TABLE 2

|  | Comparative Example 1 | Comparative Example 2 | Present Invention |
|---|---|---|---|
| Pressure drop [Pa] | 23.95 | 21.17 | 21.39 |
| k [m²/sec²] | 0.11 | 0.20 | 0.28 |
| Epsilon [m²/sec³] | 8.60 | 23.15 | 26.96 |

That is, the distillation apparatus according to the first embodiment of the present invention may have turbulent kinetic energy (k) and turbulent dissipation (epsilon) which are increased, thereby advantageously increasing transfer efficiency of a material.

This may increase efficiency for removing a volatile material from a distillation target material.

In addition, the distillation apparatus 1000 according to the first embodiment of the present invention may be formed in such a way that the fin 500 is formed at an acute angle with respect to the lower surface of the rotary cone 300 based on a rotation direction of the rotation axis 200.

The fin 500 may be inclined in a rotation direction of the rotation axis 200 to have an acute angle of 30° to 60° with respect to the lower surface of the rotary cone 300, and in detail, the fin 500 may be formed at an acute angle of 45° with respect to the lower surface of the rotary cone 300.

The aforementioned fin 500 may be formed with an acute angle with respect to the lower surface of the rotary cone, thereby reducing pressure drop.

EXPLANATION OF REFERENCE NUMERALS

100: body
110: distillation target material inlet
120: gas inlet
130: gas outlet
140: collection unit
200: rotation axis
210: rotation axis controller
300: rotary cone
400: fixed cone
410: fixed cone extension unit
500: fin
600: fan

The invention claimed is:

1. A distillation apparatus comprising:
a body into which a distillation target material is introduced from an upper portion and gas is introduced from a lower portion;
a rotation axis formed in up and down directions and configured to be axis-rotated in the body;
a plurality of rotary cones that has a lower end fixed to an outer circumferential surface of the rotation axis and a horizontal-direction diameter being widened toward an upper end;
a plurality of fixed cones spaced apart from each of the plurality of rotary cones in up and down directions and having an upper end fixed to an internal surface of the body, and a horizontal-direction diameter being reduced toward a lower end; and
at least one fin formed on a lower surface of each the plurality of rotary cones to extend in a direction toward the lower end of the plurality of rotary cones from the upper end of the plurality of rotary cones, and formed at an angle of 30° to 60° with respect to the lower surface of the plurality of rotary cones in a rotation direction of the plurality of rotary cones.

2. The distillation apparatus of claim 1, further comprising:
at least one fan formed to protrude from a selected outer circumferential surface of the rotation axis, and extended by a predetermined length to be tilted at an acute angle with respect to the down direction of the rotation axis.

3. The distillation apparatus of claim 2, wherein the at least one fan is extended to be tilted at an angle of 10° to 60° with respect to the down direction of the rotation axis.

4. The distillation apparatus of claim 1, wherein the body includes:
a distillation target material inlet formed at one side of an upper portion and configured to allow a distillation target material to be introduced thereinto;
a gas inlet formed at one side of a lower portion and configured to allow the gas to be introduced thereinto;
a gas outlet formed at a remaining side of the upper portion and configured to allow the gas to be discharged therefrom; and
a product outlet formed at a remaining side of the lower portion and configured to collect a high purity product.

* * * * *